UNITED STATES PATENT OFFICE.

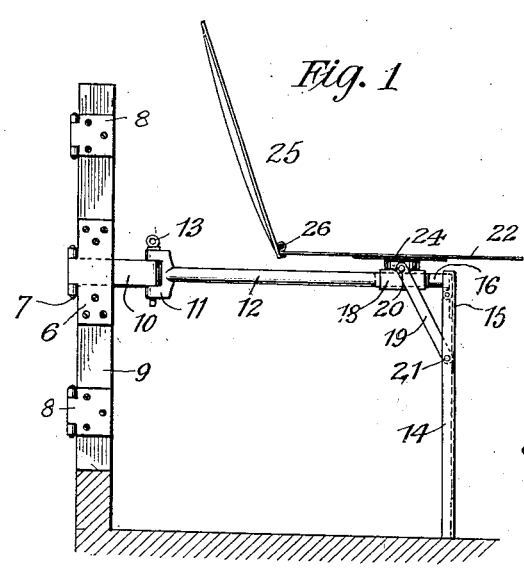
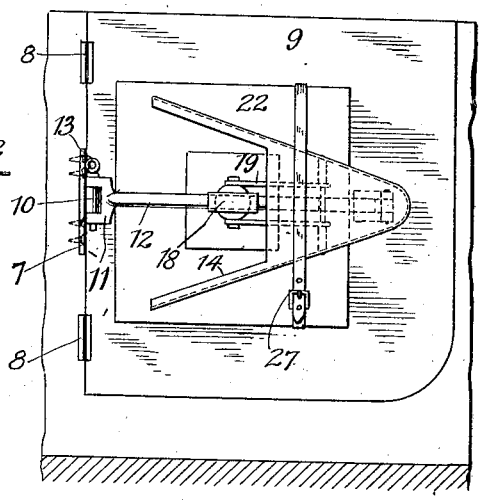
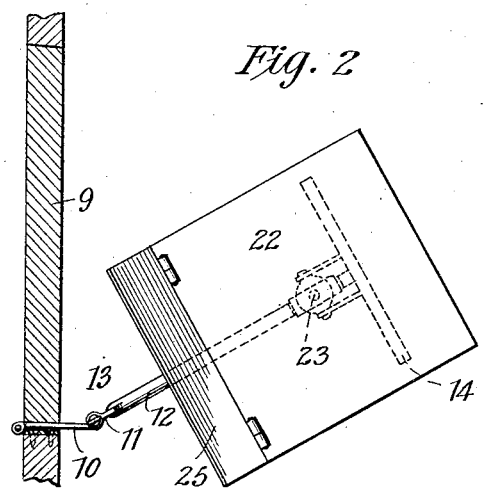
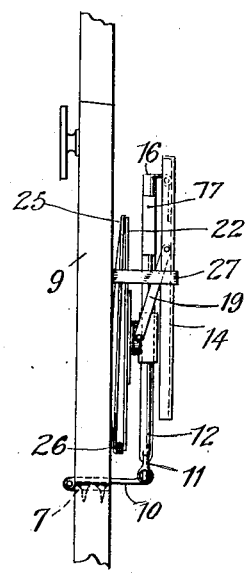
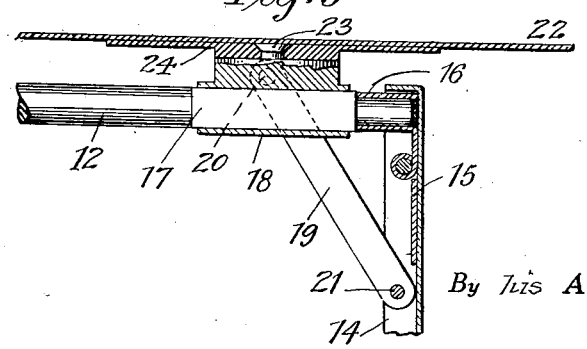

BERTHOLD SALINGER, OF NEW YORK, N. Y.

DETACHABLE AUXILIARY SEAT FOR AUTOMOBILES.

1,347,594.  Specification of Letters Patent.  Patented July 27, 1920.

Application filed October 4, 1919. Serial No. 328,570.

*To all whom it may concern:*

Be it known that I, BERTHOLD SALINGER, a citizen of the United States, and a resident of New York, county and State of New York, have invented new and useful Improvements in Detachable Auxiliary Seats for Automobiles, of which the following is a specification.

An object of this invention is to provide an auxiliary seat for automobiles adapted to swivel and to be horizontally movable, thus permitting the occupant to assume at pleasure any desired position.

Another object is to make the seat detachable so that it may be readily removed from the automobile when not required for use.

Another object is to so make the seat that it will fold up to occupy but little space and then be held against the door of the automobile in such manner as to move with the door and afford a free passage to and from the tonneau.

With these objects in view the horizontal movement of the seat is provided by a swinging connection at one end of a bar joined by a removable pin to one member of a hinge, the other member of which is secured to the body of the car, or jamb of the door, with the line of action of the hinge in alinement with the regular working hinges of the door; the bar has a round portion and a rectangular or square portion and carries a sliding member on which the seat is held by a swivel connection; the opening in the sliding member corresponds with the square portion of the bar, whereby the seat may be firmly held in horizontal position for use or in vertical position to lie parallel with the inside of the door; by moving the sliding member to the round portion of the bar the seat may be readily set from either one of these positions to the other; a supporting leg is pivotally connected to the free end of the bar and is, by links, connected to the sliding member in such manner that when the sliding member is moved from the round to the square portion of the bar the leg is extended to rest on the floor and when the sliding member is moved back on to the round portion the leg is automatically set parallel with the seat. Suitable means, as a strap, is provided to hold the seat, when folded, against the door. The hinge connection is such that the seat will move with the door when it is opened; or the door may be opened without disturbing the seat when it is adjusted for use, in which condition it may, by its swinging connection, be set independently of the door away from the door passage.

The above-mentioned preferred embodiment of the invention and other features of construction will now, by reference to the accompanying drawings, be fully described.

Figure 1, is a side elevation of the seat set up for use, looking toward the hinge edge of the door.

Fig. 2, is a plan view showing the seat in angular position.

Fig. 3, shows the seat folded and held against the door.

Fig. 4, is a view looking downwardly on the door and the folded seat thereon, and:

Fig. 5, is an enlarged sectional view of the seat, sliding member, etc.

The salient features of the invention resides in the connecting and supporting hinge, one member 6 of which is secured to the jamb of the door, with its pivot pin 7 in line with the regular door hinges 8, the other member 10 is sufficiently long to extend beyond the inner face of the door 9, and is vertically pivotally connected, as indicated at 11, to one end of the seat carrying bar 12, whereby said bar is free to move in a horizontal plane to and from the door and to move with the door when it and its appurtenances, closed in inoperative condition, are held against the door. The bar 12 and seat, etc., is detachable when not required for use in the car by the removal of the pin 13 of the joint 11.

The free or outer end of the bar 12 is supported by a bifurcated leg 14, connected near its upper end to the bar by a pivot or hinge joint, one part 15 of which is secured to the leg and the other part 16 attached by a socket to and rotatable on the end of the bar 12; the leg being so formd that its upper end bears against the end of the bar, when the leg is extended, to afford a stop to hold the leg at or about right angles to the bar, see Figs. 1 and 5.

The bar has a square portion 17 near its outer end, the main portion being cylindrical, and on it is fitted to slide a block member 18, whose bore or opening corresponds to the square portion 17, adapting it to be set and securely held in different positions on the bar and to rotate thereon when set over the round portion thereof. Links 19 connect the sides of the sliding member 18, at 20, to the leg 14, at 21, in such manner that when the sliding member is moved onto the square portion 17 of the bar the leg is set and held in supporting position, as shown in Fig. 1, and when moved on to the round portion the leg is set toward and parallel with the bar, as shown in Figs. 3 and 4.

The swiveling connection between the seat 22 and sliding member 18 is provided by a headed pin or stud 23, projecting from the center of a circular surface on the upper side of the sliding member, said pin and surface working in and against a plate 24 secured to the underside of the seat 22. The seat is shown provided with a back 25 hinged at 26 thereto, whereby the back may be folded flatwise against the seat, as shown in Fig. 4.

An examination of the drawings, particularly Fig. 2, will clearly impart the functional operations of the essential features of the invention, it will also suggest that certain features of construction may be modified or substituted by equivalent structures such as will come within the scope of the invention as hereafter claimed. The adjustable seat 22 by its swivel connection 23 permits the occupant to face in any desired direction; he may, by the vertical joint 11 of the seat bar 12, shift the seat into any desired location; the door may be opened irrespective of the seat when the seat is set up for use, leaving a free passage way to and from the tonneau; the seat may be folded to occupy but little space and be placed and held against the door, as for instance by means of a strap 27, as shown in Figs. 3 and 4, and then be movable with the door, as the supporting member 10 of the hinge will also move with the door working on the fixed member 7; and the auxiliary seat may, by the removal of the pin 13, be readily separated from its connection with car when not required therein.

I claim:

1. An auxiliary seat for automobiles, comprising a hinge operative in line with the ordinary hinges of a door and having one member free of the door extending beyond the inner face of the door, a bar vertically pivotally connected at one end to the free member of the hinge, a seat carried by the bar and a supporting leg at the other end of the bar.

2. An auxiliary seat for automobiles, comprising a hinge operative in line with the ordinary hinges of a door and having one member free of the door and extending beyond the inner face of the door, a bar vertically pivoted at one end to the free member of the hinge, a seat carried by the bar and adapted to be set in horizontal and vertical positions parallel with the bar and a supporting leg pivotally connected to the other end of the bar so as to fold parallel with the seat or be placed at right angles to the bar.

3. An auxiliary seat for automobiles, comprising a hinge operative in line with the ordinary hinges of a door and having one member free of the door and extending beyond the inner face of the door, a bar vertically pivoted at one end to the free member of the hinge, a seat carried by the bar and adapted to be set in vertical and horizontal positions parallel with the bar, a supporting leg pivotally connected to the other end of the bar so as to fold parallel with the seat or be placed at right angles to the bar and means for holding the device in folded condition against the door.

4. An auxiliary seat for automobiles, comprising a hinge operative in line with the ordinary hinges of a door and having one member free of the door and extending beyond the inner face of the door, a bar vertically pivoted at one end to the free member of the hinge, a seat, a slide on which the seat is held carried by the bar, a supporting leg pivotally connected to the other end of the bar and means connecting the slide and leg, whereby when the slide is moved in direction away from the pivotal connection of the bar and leg, said leg will be folded against the bar and parallel with the seat.

5. An auxiliary seat for automobiles, comprising a hinge operative in line with the ordinary hinges of a door and having one member free of the door and extending beyond the inner face of the door, a bar vertically pivotally connected at one end to the free member of the hinge so as to be movable in a horizontal plane, a seat, a slide carried by and rotatable on the bar, a swivel connection between the seat and slide, a supporting leg having a hinge connection to the other end of the bar and adapted to abut against the end of the bar when set at or about right angles to the bar and means connecting the slide and leg, whereby a movement of the slide along the bar sets the leg at right angles thereto or parallel therewith.

6. An auxiliary seat for automobiles, coming a hinge operative in line with the ordinary hinges of a door and having one member free of the door and extending beyond the inner face of the door, a bar vertically pivotally connected at one end to the free member of the hinge so as to be movable in a horizontal plane, means for detaching the bar from the hinge, a seat carried by the bar and adapted to be set in horizontal and vertical positions parallel with the bar and a supporting leg having a connection with the outer end of the bar, whereby it may be set at right angles to the bar and be set parallel with the seat in both of the positions of the seat on the bar.

7. An adjustable auxiliary seat, comprising a bar having a pivotal support at one end and adapted to swing in a horizontal plane, a leg pivotally connected to the other end of the bar, a slide on the bar, a seat on the slide and links connecting the slide to the leg, whereby movements of the slide along the bar will cause the leg to be set at right angles to or parallel with the bar and seat.

8. An adjustable auxiliary seat, comprising a bar having a pivotal support at one end and adapted to swing in a horizontal plane, a leg pivotally connected to the other end of the bar, the bar member of said pivotal connection being rotatable on the bar, a slide on the bar rotatable thereon, a seat on the slide and links connecting the slide to the leg, whereby movements of the slide on the bar will cause the leg to be set at right angles to or parallel with the bar and seat.

9. An adjustable auxiliary seat, comprising a bar pivotally supported at one end so as to swing in a horizontal plane and having a square portion near its other end, a leg pivotally connected to this other end of the bar, the bar member of said pivotal connection being rotatable on the bar, a slide on the bar rotatable thereon and with its bore fitted to embrace the square portion of the bar, a seat held on the slide by a swiveling connection, and links connecting the slide to the leg.

Signed at New York, county and State of New York, this 27th day of September, 1919.

BERTHOLD SALINGER.

In the presence of—
BENJAMIN SAM,
JOHN L. PODESTO.